(12) United States Patent  (10) Patent No.: US 7,550,886 B2
Hill et al.  (45) Date of Patent: Jun. 23, 2009

(54) MOTOR END BELL HAVING TERMINAL ACCESS OPENING AND COVER

(75) Inventors: Jason J. Hill, Manchester, MO (US); Donald E. Morgan, Florissant, MO (US); Jeffrey S. Sherman, Creve Coeur, MO (US)

(73) Assignee: Emerson Electric Co., St. Louis, MO (US)

( * ) Notice: Subject to any disclaimer, the term of this patent is extended or adjusted under 35 U.S.C. 154(b) by 248 days.

(21) Appl. No.: 11/561,739

(22) Filed: Nov. 20, 2006

(65) Prior Publication Data

US 2008/0136273 A1   Jun. 12, 2008

(51) Int. Cl.
 *H02K 5/10* (2006.01)
(52) U.S. Cl. .............................. 310/88; 310/89; 310/91

(58) Field of Classification Search .................... 310/71, 310/88, 89, 91
See application file for complete search history.

(56) References Cited

U.S. PATENT DOCUMENTS 4,707,627 A * 11/1987 Best ............................. 310/71
4,812,693 A * 3/1989 Baines ......................... 310/71
5,006,742 A    4/1991 Strobl et al.

* cited by examiner

*Primary Examiner*—Nguyen N Hanh
(74) *Attorney, Agent, or Firm*—Senniger Powers LLP

(57) ABSTRACT

A motor end bell assembly includes an end bell having an opening in a face of the end bell for accessing terminals of the motor. An additional aperture in the end bell facilitates passage of a power cord through the end bell. A cover at least partially closes the opening and is formed as a single piece of material. The cover includes a tab for at least partially closing the aperture.

19 Claims, 10 Drawing Sheets

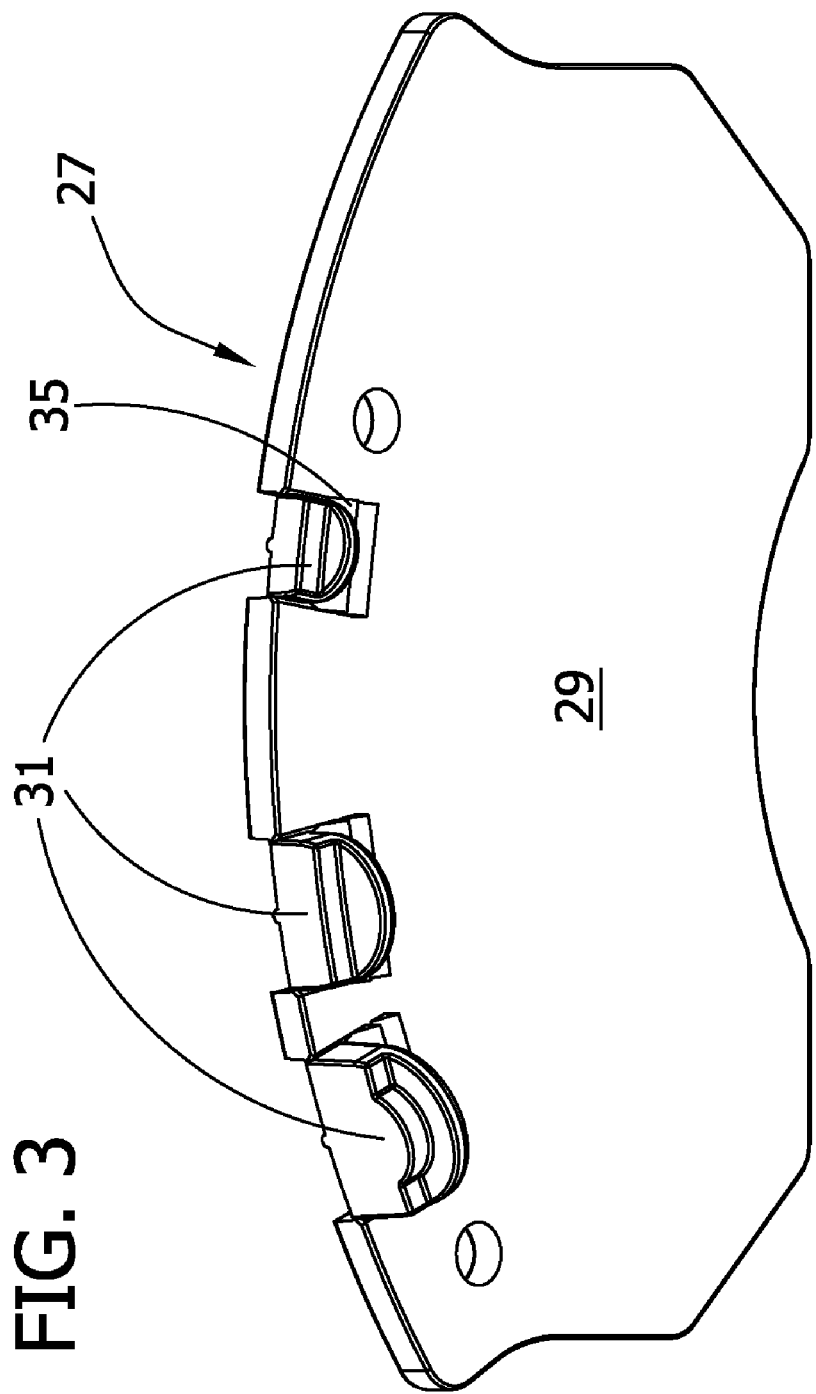

MOTOR END BELL HAVING TERMINAL ACCESS OPENING AND COVER

FIELD OF THE INVENTION

This invention relates to a motor having a terminal access opening, and more particularly to arrangements for covering the terminal access opening.

BACKGROUND OF THE INVENTION

Electric motors may include an access opening, for example, to allow an installer to install one of a variety of different sized power cords to the terminals. Typically, the access opening is in the end bell, and is adjacent the power terminals of the motor. Such a motor may run at different voltages or horsepower depending on the application, so an installer or user may need to install different sized power cords. Prior art motors have included covers that enable different sized power cords to pass through the cover. These covers serve, to some degree, to protect the motor from water, impact or other damage. However, such covers have not been completely effective, reliable or cost efficient.

SUMMARY OF THE INVENTION

In one aspect of the invention, a motor end bell assembly includes an end bell having an opening in a face of the end bell for accessing terminals of the motor. An additional aperture in the end bell facilitates passage of a power cord through the end bell. A cover at least partially closes the opening and is formed as a single piece of material. The cover includes a tab for at least partially closing the aperture.

In another aspect, an electric motor includes terminals for connecting a power cord to the motor. The motor also comprises an end bell assembly including an end bell having a main opening adjacent the terminals to enable access to the terminals. First and second apertures extend from the main opening for facilitating passage of the power cord. A cover for the opening and apertures is formed as a single piece of plastic material. The cover including a main body closing the main opening and first and second frangible tabs extending from the main body for closing the first and second apertures.

Various refinements exist of the features noted in relation to the above-mentioned aspects of the present invention. Further features may also be incorporated in the above-mentioned aspects of the present invention as well. These refinements and additional features may exist individually or in any combination. For instance, various features discussed below in relation to any of the illustrated embodiments of the present invention may be incorporated into any of the above-described aspects of the present invention, alone or in any combination.

BRIEF DESCRIPTION OF THE DRAWINGS

FIG. 3 is an enlarged perspective of a cover of the end bell assembly.

Corresponding reference characters include corresponding parts throughout the drawings.

DETAILED DESCRIPTION OF THE DRAWINGS

Figure 1:
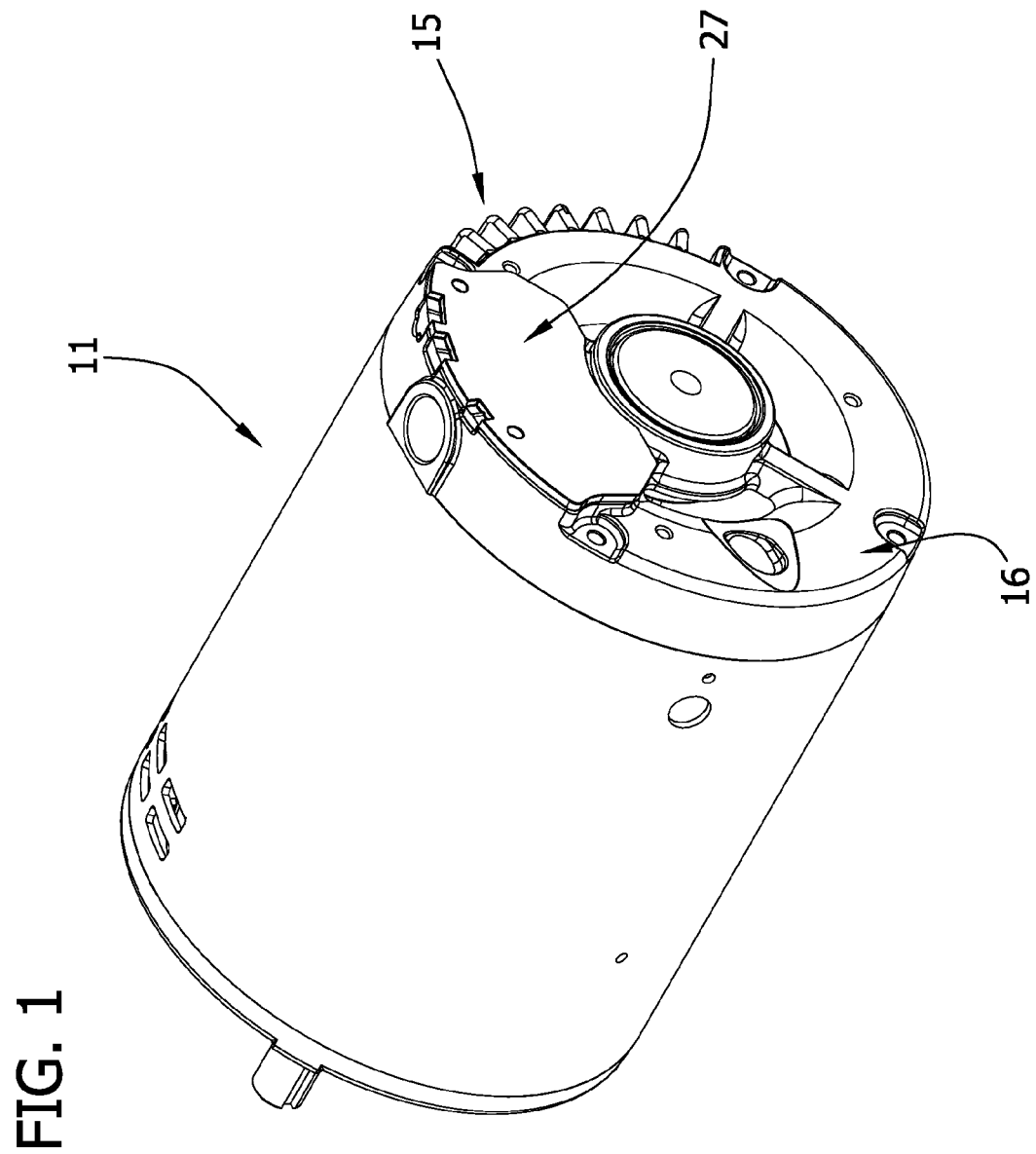
FIG. 1 is a perspective of one embodiment of a motor and end bell assembly of the invention.
Figure 2:
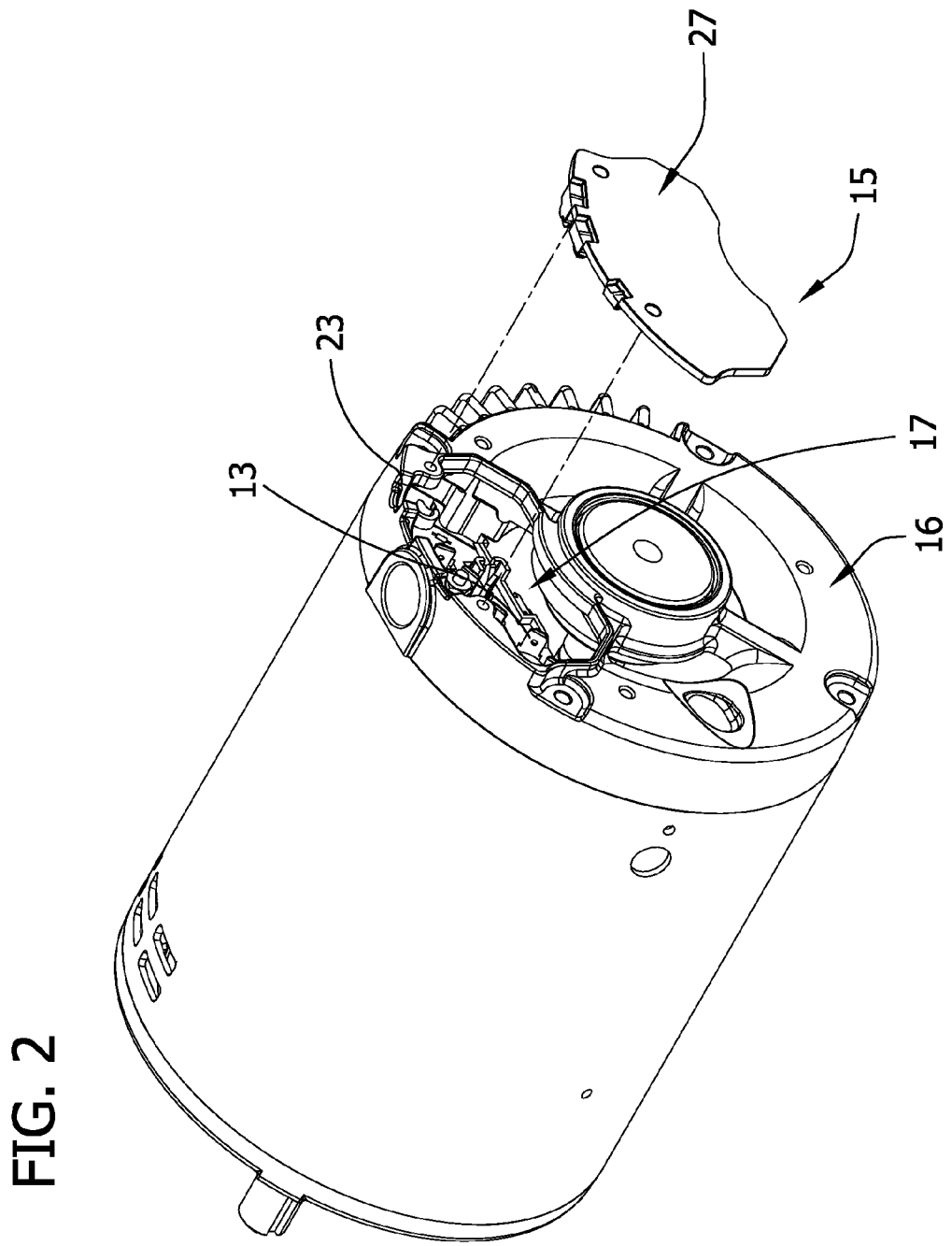
FIG. 2 is an exploded view of the end bell assembly of FIG. 1, the cover of the assembly being removed.
Figure 2A:
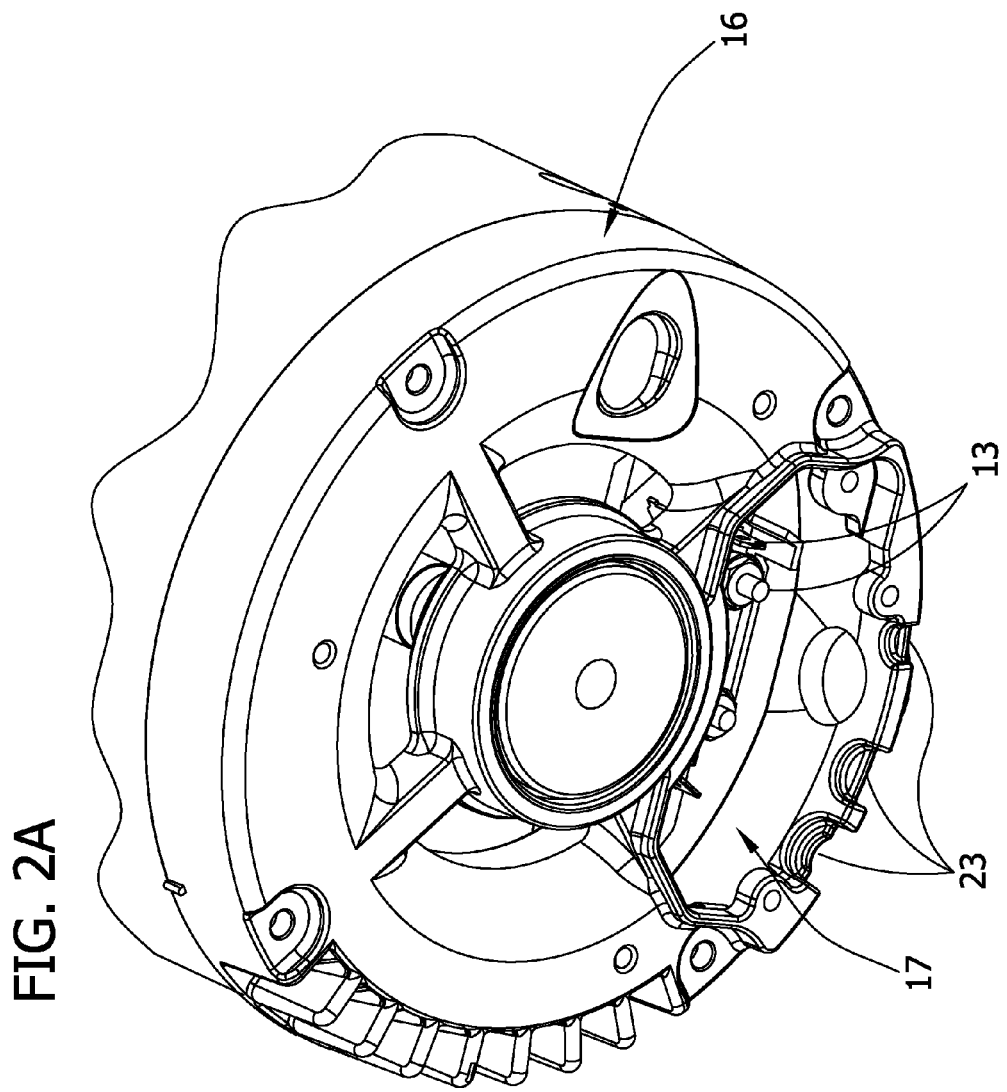
FIG. 2A is an enlarged perspective of the end bell of the assembly.

Referring to FIGS. 1-2A, a motor of one embodiment is generally designated 11. The motor 11 may include a conventional rotor and stator (not shown), and terminals (FIG. 2) for connecting power to the motor. Many other motor configurations are contemplated within the scope of the invention.

As shown in FIGS. 2-2A, a motor end bell assembly 15 of one embodiment includes an end bell 16 having a main opening 17 in a face of the end bell. The main opening 17 in the end bell 16 is sized for accessing the terminals 13 of the motor 11, e.g., so that a user may attach a power cord 21 (FIG. 5) to the terminals. An additional aperture 23 extends from the main opening 17 into the side of the end bell 16 for facilitating passage of the power cord 21 through the end bell. In this embodiment, three such apertures 23 are shown, though any number may be used, and the apertures may have shapes other than the U-shape shown herein. Each aperture 23 is sized differently so that a different sized power cord 21 may be passed therethrough. Each aperture 23 opens at the edge of the main opening 17, but may be otherwise connected with the opening so that the power cord 21 can be inserted into one of the apertures from the opening during installation of the power cord. Note the main opening 17 of this embodiment has an area that is several times larger (three or more times larger) than the area of the cord aperture 23. Thus, the opening 17 provides easy access to the terminals 13 during installation. Also note the term "end bell" is used broadly to include end shields, covers and other motor housing or frame components.

Figure 4:
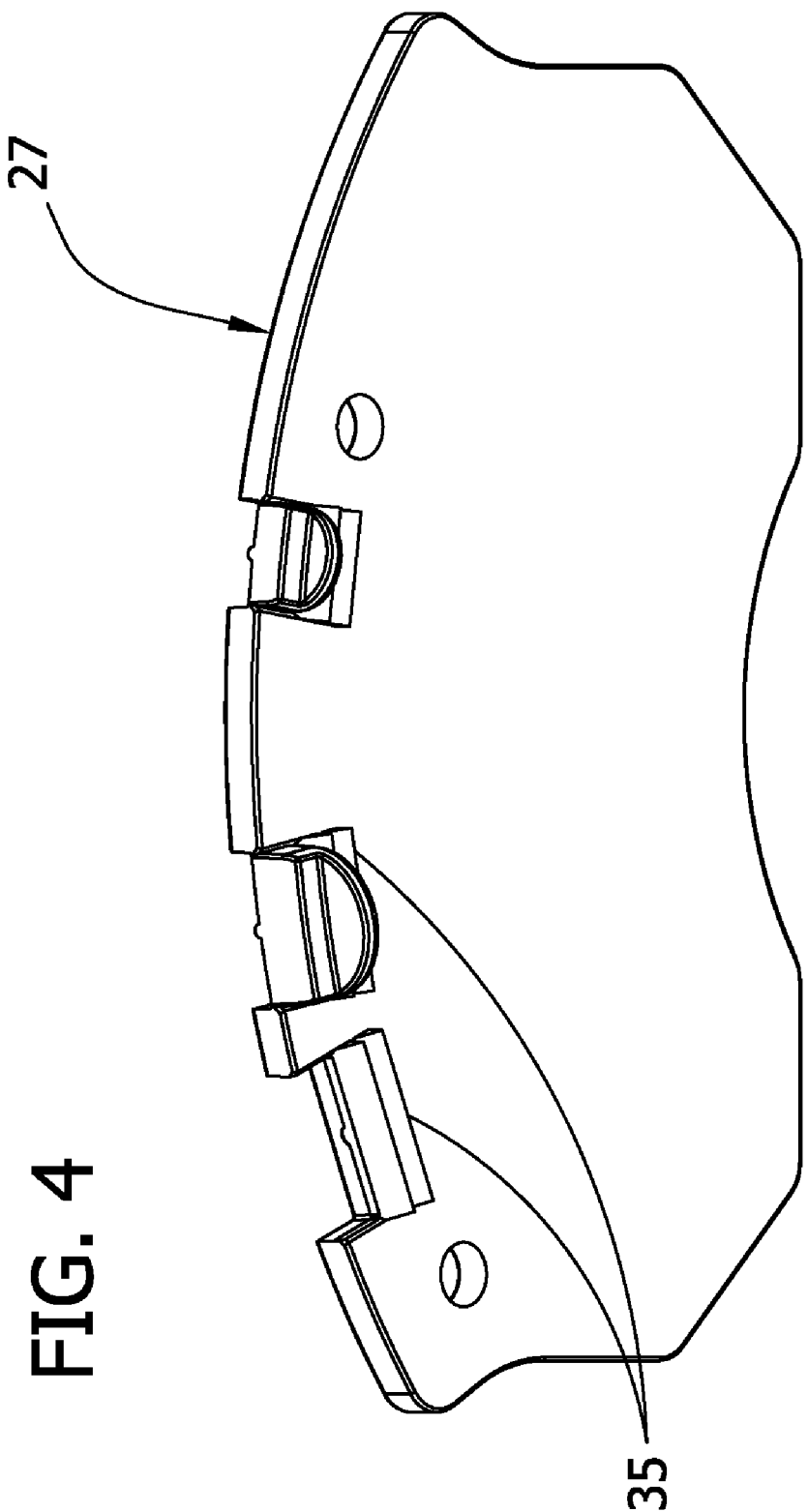
FIG. 4 is a perspective like FIG. 3 but with one of the tabs of the cover removed.

A cover 27 at least partially closes the opening 17, and in this embodiment covers the entire opening. The cover 27 includes a main body 29 for covering the opening 17 and tabs 31 extending from an outward edge of the body for covering, or in other embodiments at least partially closing, the apertures 23. In this embodiment, the tabs 31 extend at substantially right angles from the main body 29 of the cover 27 (FIGS. 3-4).

Each tab 31 is sized to correspond or mate with one of the apertures 23. In this case, each tab 31 has a rounded tapered shape to engage a groove in the end bell 16. Many other tab shapes are contemplated. Each tab 31 of this embodiment is also frangible to allow the user to break the tab away (as shown in FIG. 4). For example, the tab 31 may be thinner than the main body to facilitate removing the tab. It is also contemplated within the scope of the invention that only a portion of the tabs be frangible. Further, the tabs may be cut away, e.g., made so that they are not frangible.

The cover 27 of one embodiment is formed as a single piece of rigid, plastic material, such as an injection molded polymeric. The material is selected based on material strength and resiliency. For example, the cover is sufficiently rigid to withstand an impact of about five foot-pounds, as during an Underwriters Laboratory (UL) "drop ball" test. In one example, the test is performed using a two inch diameter, 1.18 pound steel ball dropped through a four foot long tube onto the cover 27. The cover 27 may also be made to inhibit heat or flame damage, e.g., to withstand a UL flame test.

The apertures 23 in the end bell 16 of this embodiment are modified from that of prior art end bells to better conform or be complementary to the shape of the tabs. The apertures 23 may optionally include grooves for receiving the tabs, e.g., in a "tongue and groove" configuration. However, it is within the scope of the invention to use a prior art or conventional end bell that has not been modified and does not include grooves or other shapes for conforming to the shape of the tabs of the cover.

Figure 5:
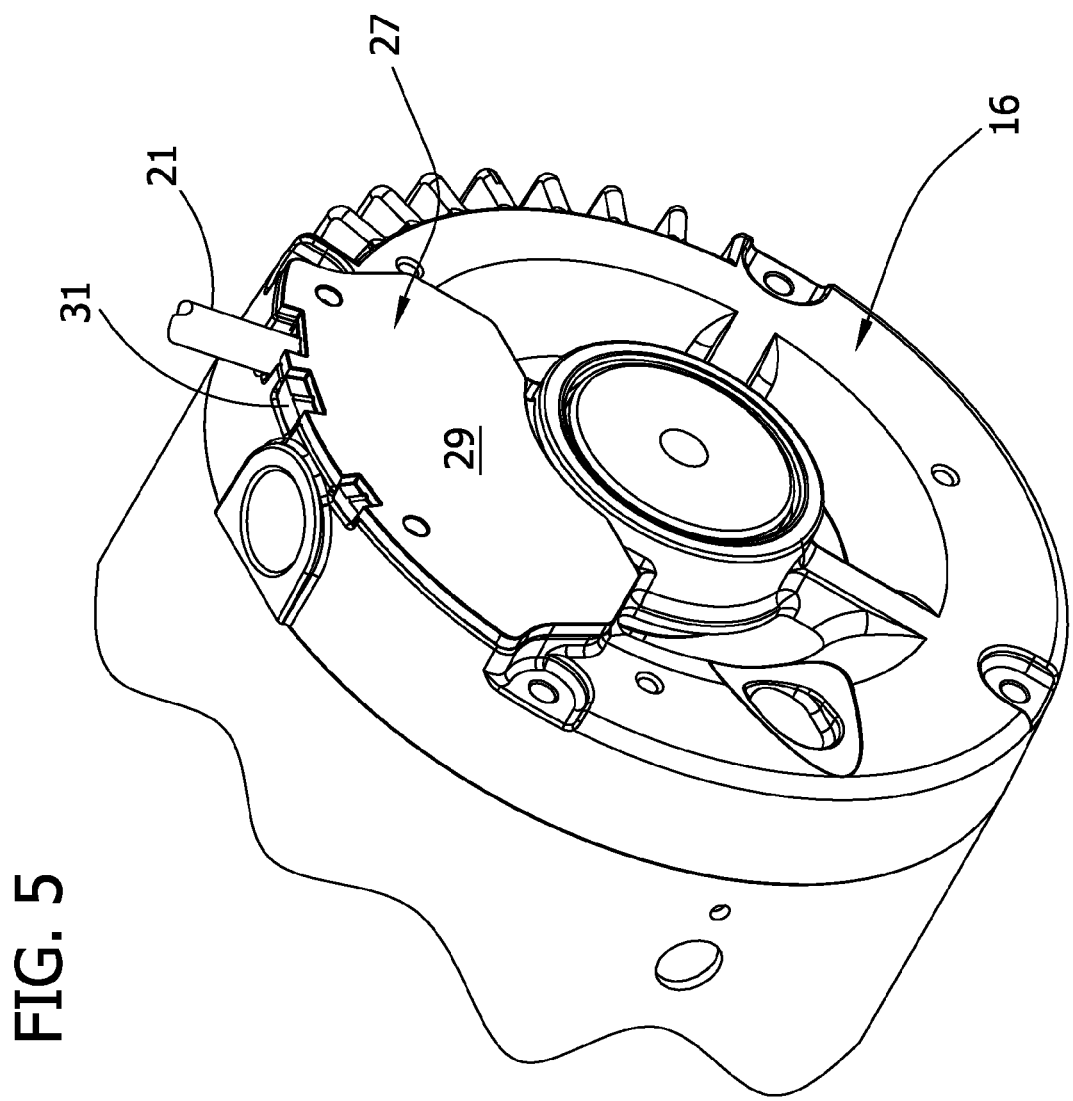
FIG. 5 is a perspective of a portion of the motor with a power cord installed.
Figure 6:
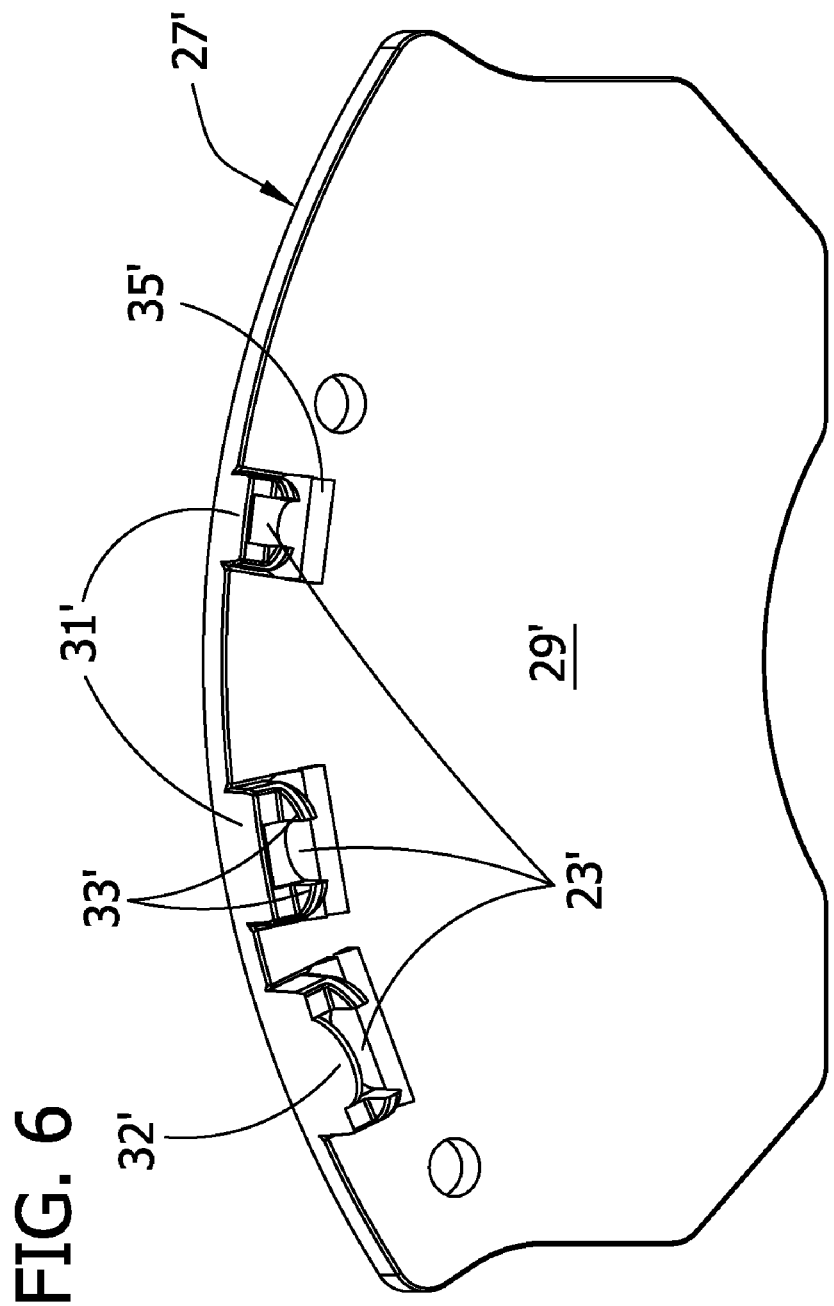
FIG. 6 is a perspective of a cover of another embodiment.
Figure 7:
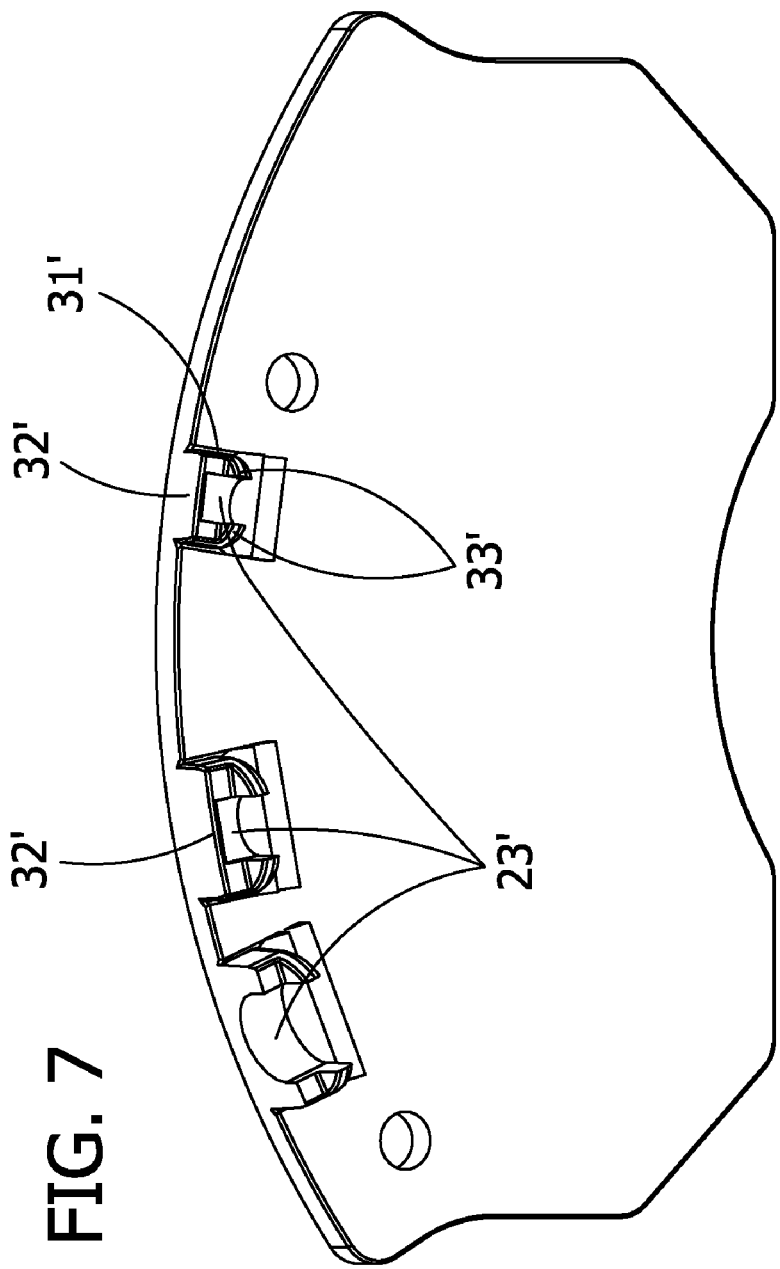
FIG. 7 is a perspective like FIG. 6 but with a portion of a tab removed.
Figure 8:
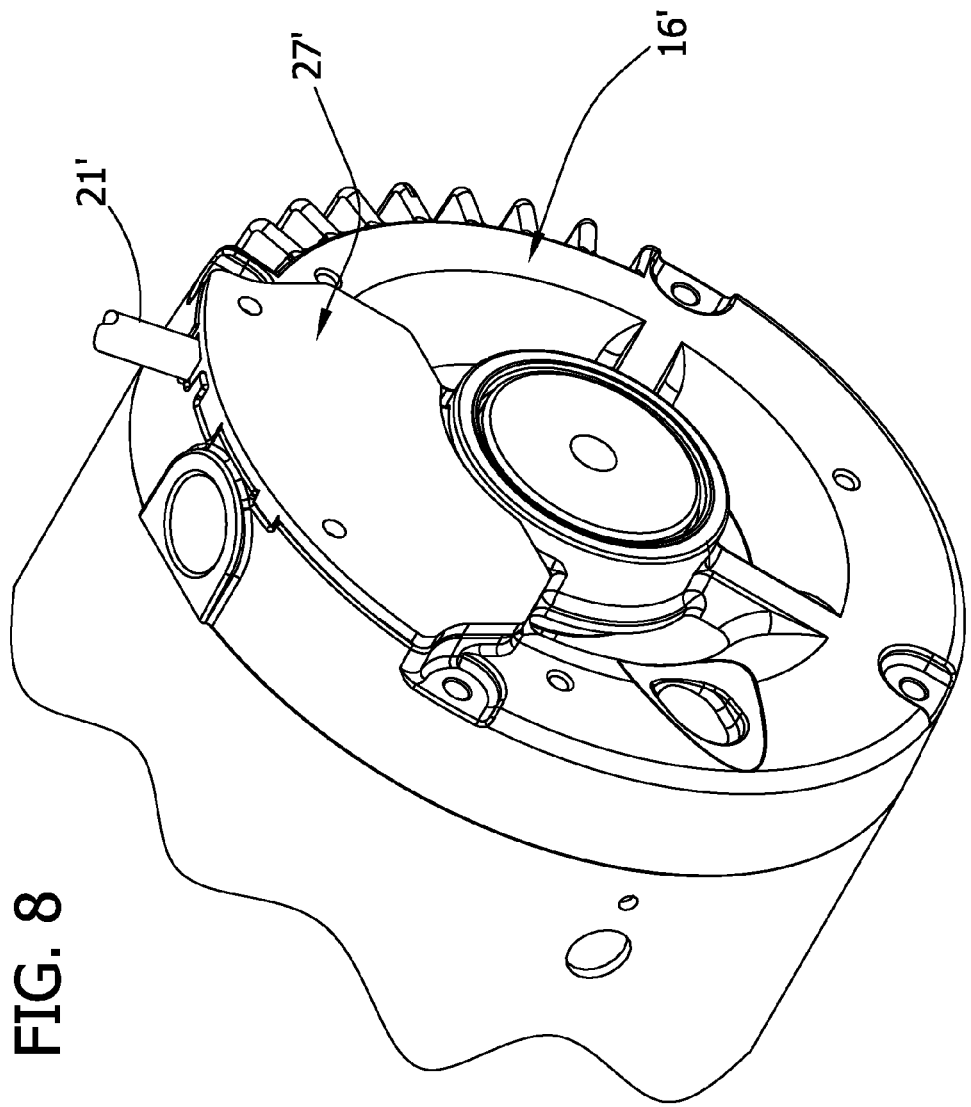
FIG. 8 is a perspective of a portion of a motor having the cover of FIG. 7 installed over a power cord and end bell.
Figure 9:
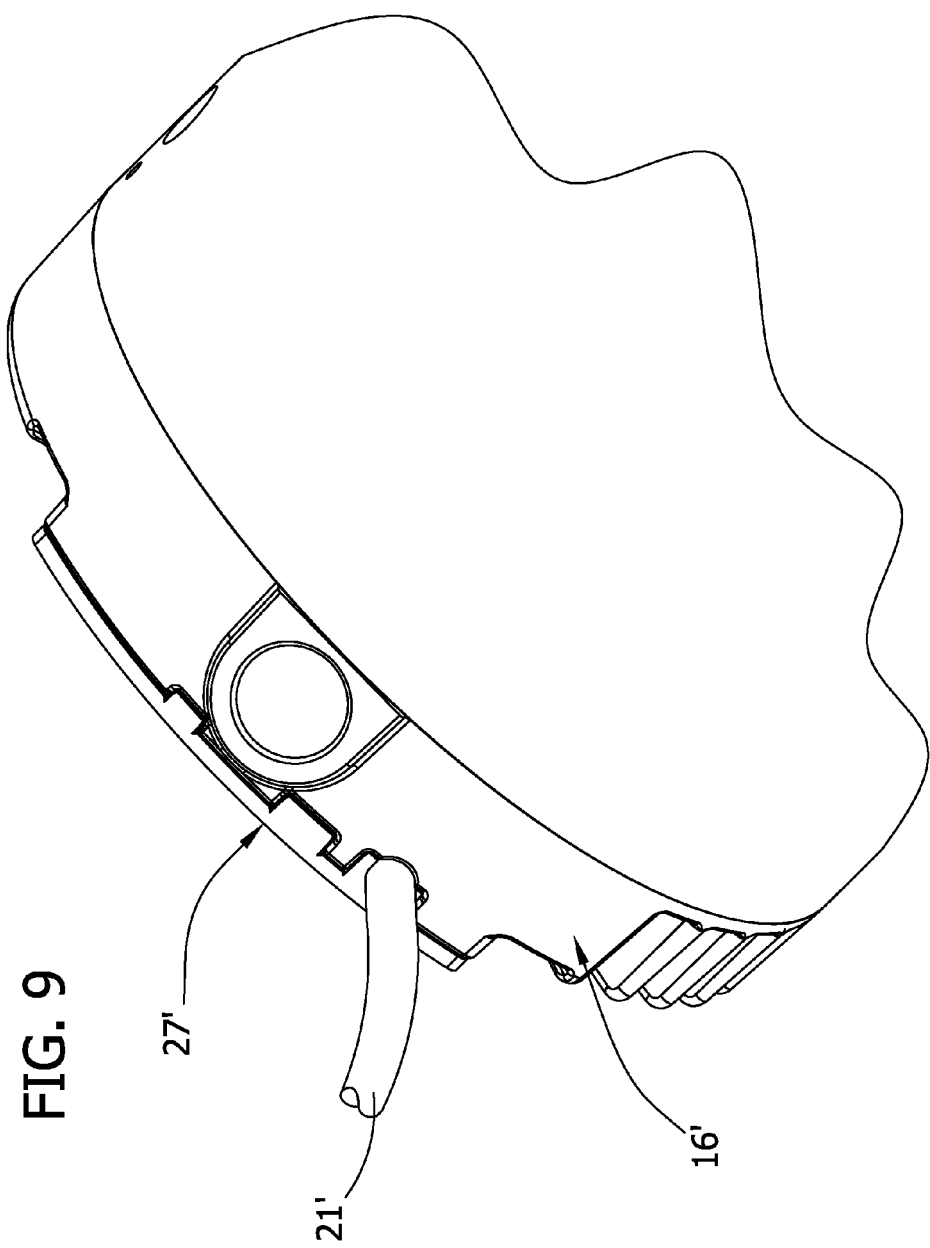
FIG. 9 is a front elevation of the end bell of FIG. 8 and showing the cord through the cover.

During installation or field connection of the motor 11, the user will typically remove the cover 27 and break just one of the tabs 31 away, i.e., the one corresponding to the aperture 23 that is to receive the power cord 21. As shown in FIG. 5, the power cord 21 is thereafter placed in the aperture 23, and the cover 27 attached (as by fasteners) so the cord is secured between the end bell 16 and the cover.

The cover 27 and end bell 16 also provide strain relief for the cord 21. In this embodiment, the cover 27 includes ribs 35 (FIGS. 3-4) for holding the power cord 21 and for strain relief. There are multiple sets of ribs 35, e.g., one set for each tab 31. The ribs 35 are shaped, such as beveled or angled as shown, to inhibit motion of the cord 21 after installation. Other structures for gripping the cord 21 and providing strain relief are contemplated within the scope of the invention.

The cover 27, including the tabs 31, and the end bell 16 of this embodiment cooperate to protect the terminals 13 and motor 11 from water damage. For example, the cover 27 and end bell 16 may protect the terminals 13 and motor 11 from water splashes, as proven by a UL splash test and/or a UL rain test.

In another embodiment shown in FIGS. 6-9, each tab 31' includes a removable thin wall portion 32' and two fingers 33' spaced-apart to receive the cord 21' therethrough. The thin wall portion 32' is shown removed on one of the tabs 31' of FIG. 7. The thin wall portion 32' may be made frangible for easy break out by the installer, or may be made to be cut away using a knife.

The apertures 23' in the end bell 16' may also be made to conform to the shape of the tabs 31'. The apertures 23' may optionally include grooves (as shown in the first embodiment) for receiving the fingers 33' and thin wall portions 32' of the tabs 31'. This complementary shape of the end bell 16' and tabs 31' ensures better engagement between the cover 27' and end bell. This engagement inhibits entry of water and debris and thereby better protects the motor from damage.

The two fingers 33' and the shape of the aperture 23' in the end bell 16' facilitate gripping of the cord 21' between the cover 27' and end bell. Like the first embodiment, ribs 35' extend from the main body 29' of the cover 27', and the ribs 35' are spaced from the fingers 33' to further facilitate gripping the cord 21'. As shown, there are two parallel, spaced apart ribs 33' adjacent each tab 31', though other numbers and configurations are contemplated. In this embodiment, the cover 27' and end bell 16' hold the cord 21' against a load of at least about 35 pounds, as may be proven in a UL 35 pound pull test.

The end bell assemblies of embodiments of the invention may be adapted to fit motors of different horsepower or voltage, or a variety of types of motors. Such motors may use a variety of different sized power cords. The respective holes caused by removal of a tab, and the corresponding apertures through the end bell may be sized to accommodate such cords.

As noted above, prior art covers were not completely satisfactory, e.g., they were made of multiple parts and were generally too expensive. In contrast, an integral one-piece plastic cover of an embodiment of the invention is easy to install and to manufacture, making it cost effective. Such a cover provides significant cost savings and serves some or all of the functions of impact, splash, and cord pull protection while also accommodating different sized cords.

When introducing elements of various aspects of the present invention or embodiments thereof, the articles "a", "an", "the" and "said" are intended to mean that there are one or more of the elements. The terms "comprising", "including" and "having" are intended to be inclusive and mean that there may be additional elements other than the listed elements. Moreover, the use of "top" and "bottom", "front" and "rear", "above" and "below" and variations of these and other terms of orientation is made for convenience, but does not require any particular orientation of the components.

As various changes could be made in the above constructions, methods and products without departing from the scope of the invention, it is intended that all matter contained in the above description or shown in the accompanying drawings shall be interpreted as illustrative and not in a limiting sense.

What is claimed is:

1. A motor end bell assembly comprising
an end bell having an interior, an opening in a face of the end bell for accessing terminals of the motor positioned in the interior, and an aperture extending from the opening for facilitating passage of a power cord through the end bell, and
a cover formed as a single piece of material including a main body at least partially closing the opening and a tab extending from a peripheral edge of the main body for at least partially closing the aperture without filling the interior of the end bell.

2. The motor end bell assembly of claim 1 wherein a shape of the end bell and a shape of the tab are complementary to inhibit entry of water through the aperture when the power cord is not in the aperture.

3. The motor end bell assembly of claim 2 wherein the aperture comprises a U-shaped slot extending from the opening, and a groove extending into the end bell from the slot.

4. The motor end bell assembly of claim 1 wherein there are at least three apertures, each of a different size, so as to accommodate power cords of different sizes.

5. The motor end bell assembly of claim 1 wherein the cover is formed as a single piece of plastic material.

6. The motor end bell assembly of claim 5 wherein the cover is sufficiently rigid to withstand an impact of five footpounds.

7. The motor end bell assembly of claim 1 further comprising a power cord held between the cover and the end bell, the cover and end bell holding the cord against a load of at least 35 pounds.

8. The motor end bell assembly of claim 7 wherein the cover includes ribs for holding the power cord.

9. The motor end bell assembly of claim 1 wherein the end bell is adapted to fit motors of different horsepower or voltage.

10. A motor end bell assembly comprising
an end bell having an opening in a face of the end bell for accessing terminals of the motor,
at least two apertures for facilitating passage of a power cord through the end bell, and a cover at least partially closing the opening and formed as a single piece of material, the cover including a main body for covering the opening and at least two tabs extending from an outward edge of the body, each tab at least partially closing one of the apertures and being at least partially frangible from the main body to allow passage of a power cord through one of the apertures.

11. The motor end bell assembly of claim 10 wherein the pairs of tabs and apertures are of different sizes to accommodate different sized cords.

12. A motor end bell assembly comprising
an end bell having an opening in a face of the end bell for accessing terminals of the motor,
an aperture for facilitating passage of a power cord through the end bell, and
a cover at least partially closing the opening and formed as a single piece of material, the cover including a tab for at least partially closing the aperture, the tab including a removable thin wall portion and two fingers spaced-apart to receive the cord therethrough.

13. The motor end bell assembly of claim 12 wherein the two fingers and
the shape of the end bell facilitate gripping of the cord therebetween.

14. The motor end bell assembly of claim 13 further comprising ribs extending from the main body and spaced from the fingers to further facilitate gripping the cord.

15. An electric motor comprising
terminals for connecting a power cord to the motor,
an end shield assembly including:
an end shield having a main opening adjacent the terminals to enable access to the terminals,
first and second apertures extending from the main opening for facilitating passage of the power cord through the end shield,
a cover formed as a single piece of plastic material,
the cover including a main body closing the main opening and first and second frangible tabs extending from the main body for closing the first and second apertures.

16. The motor of claim 15 in combination with the power cord, one of the tabs being removed and the power cord extending through the corresponding aperture.

17. The motor of claim 16 wherein the cover includes ribs for holding the power cord.

18. The motor of claim 17 wherein the cover closing the main opening and the apertures such that water is inhibited from entering the main opening and apertures, and wherein the cover is sufficiently rigid to protect the terminals from impact damage of at least five foot-pounds.

19. The motor of claim 17 wherein the end shield includes a third aperture and wherein the cover includes a third tab.

* * * * *